(12) United States Patent
Ryu (10) Patent No.: US 8,767,089 B2
(45) Date of Patent: Jul. 1, 2014

(54) DIGITAL IMAGE PROCESSING APPARATUS AND METHOD FOR DISPLAYING A MODIFIED IMAGE THAT WHEN VIEWED THROUGH A FILTER APPEARS AS A CORRESPONDING UNMODIFIED IMAGE APPEARS WHEN VIEWED WITHOUT THE FILTER

(75) Inventor: Hun-young Ryu, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 13/174,872

(22) Filed: Jul. 1, 2011

(65) Prior Publication Data

US 2012/0026355 A1 Feb. 2, 2012

(30) Foreign Application Priority Data

Jul. 29, 2010 (KR) .......................... 10-2010-0073534

(51) Int. Cl.
*H04N 9/73* (2006.01)

(52) U.S. Cl.
USPC ................... 348/225.1; 348/222.1; 348/223.1; 348/224.1; 382/167

(58) Field of Classification Search
USPC ............... 348/223.1, 222.1, 224.1, 225.1; 382/167
See application file for complete search history.

(56) References Cited

U.S. PATENT DOCUMENTS

| | | | | |
|---|---|---|---|---|
| 4,734,756 A * | 3/1988 | Butterfield et al. | ............. | 348/43 |
| 4,736,244 A * | 4/1988 | Shiota et al. | .................. | 358/506 |
| 6,683,716 B1 * | 1/2004 | Costales | ...................... | 359/465 |
| 6,961,086 B1 * | 11/2005 | Ichikawa | .................... | 348/223.1 |
| 7,268,817 B2 | 9/2007 | Lee et al. | | |
| 2003/0086601 A1 * | 5/2003 | Lee et al. | ...................... | 382/154 |
| 2006/0115151 A1 * | 6/2006 | Tsuchiya | ....................... | 382/169 |

* cited by examiner

*Primary Examiner* — Antoinette Spinks
(74) *Attorney, Agent, or Firm* — Drinker Biddle & Reath LLP (57) ABSTRACT

Provided are a digital image processing apparatus, and a method of controlling the same, the method including inputting a setup image having a first region input via a filter; extracting first color information from the first region; retrieving a stored image; generating a display image by changing colors of the stored image based on the first color information; and displaying the display image.

14 Claims, 7 Drawing Sheets

| ITEMS | | A(WHITE) | B | A−B |
|---|---|---|---|---|
| CONTRAST | S | 100 | 70 | 30 |
| BRIGHTNESS | B | 100 | 100 | 0 |
| COLORS | R | 255 | 76 | 179 |
| | G | 255 | 76 | 179 |
| | B | 255 | 255 | 0 |

FIG. 8

| ITEMS | | X(BLUE) | B | Y(X−B) |
|---|---|---|---|---|
| CONTRAST | S | 100 | 70 | 30 |
| BRIGHTNESS | B | 100 | 100 | 0 |
| COLORS | R | 0 | 76 | 180 |
| | G | 0 | 76 | 180 |
| | B | 255 | 255 | 0 |

DIGITAL IMAGE PROCESSING APPARATUS AND METHOD FOR DISPLAYING A MODIFIED IMAGE THAT WHEN VIEWED THROUGH A FILTER APPEARS AS A CORRESPONDING UNMODIFIED IMAGE APPEARS WHEN VIEWED WITHOUT THE FILTER

CROSS-REFERENCE TO RELATED PATENT APPLICATION

This application claims the benefit of Korean Patent Application No. 10-2010-0073534, filed on Jul. 29, 2010, in the Korean Intellectual Property Office, the entire disclosure of which is incorporated herein by reference.

BACKGROUND

1. Field of the Invention

The invention relates to a digital image processing apparatus and a method of controlling the same, and more particularly, to a digital image processing apparatus and a method of controlling the same, which adjusts an image for a user seeing the image through a colored filter.

2. Description of the Related Art

Generally, digital image processing apparatuses include any devices for inputting or processing images or devices using an image recognition sensor on images from devices, including a film camera, a digital camera, a personal digital assistant (PDA), a phone camera, a PC camera, or the like.

Especially, a digital image processing apparatus may receive an image via an imaging device, may perform image processes on the image, may generate an image file by compressing the processed image, and store the image file in a memory.

Furthermore, a digital image processing apparatus may display an image of an image file received via an imaging device or stored in a storage medium on a display unit, such as a liquid crystal display (LCD) device, so that a user may confirm an image of an image file.

Also, a user with pair of colored glasses may view an image displayed on a display unit. In this case, an image displayed on the display unit may be seen in different colors than would be seen without the colored the glasses. This may be inconvenient to the user who may have to take off their colored glasses to view the image.

SUMMARY

Therefore, there is a need in the art for a digital image processing apparatus, and method of controlling the same, which enables a user with pair of colored glasses to view an image in colors close to the actual colors of the image.

A digital image processing apparatus is disclosed. The digital image processing apparatus includes an image input unit configured to receive a setup image comprising a first region input via a filter; a storage unit configured to store a first color information and a stored image; a control unit configured to determine first color information from the first region, and configured to convert the stored image to a display image based on the first color information; and a display unit configured to display the display image.

The first region may be a region in which an image of a white object is input via colored glasses.

The control unit may be configure to convert the display image by adjusting gradation values of colors of the stored image using the first color information.

The setup image may further include a second region input not via the filter.

The control unit may further be configured to determine second color information from the second region, and the control unit is further configured to convert a display image by adjusting a white balance of the stored image based on the second color information.

The first region may be a region in which an image of a white object is input via colored glasses, and the second region is a region in which the image of the white object is input not via the colored glasses.

The controller unit may further be configured to convert the stored image to a display image by changing colors of the stored image based on color difference information between first color information and second color information.

The controller may further be configured to determine a color conversion table that includes gradation values based on color difference information, and the control unit is further configured to convert the stored image to a display image by changing colors of the stored image based on the color conversion table.

The control unit may further be configured to convert the stored image to a display image by changing gradation values of the stored image based on the first color information, and adjust white balance based on second color information.

A method of controlling a digital image processing apparatus is disclosed. The method includes inputting a setup image having a first region input via a filter; extracting first color information from the first region; retrieving a stored image; generating a display image by changing colors of the stored image based on the first color information; and displaying the display image.

The first region may be a region in which an image of a white object is input via colored glasses.

The display image may be generated by calculating gradation values of colors for the display image based on gradation values of colors of the stored image and gradation values of colors of the first color information.

The setup image may further comprises a second region input not via the filter.

The method may include extracting second color information from the second region, and adjusting a white balance of the stored image input based on the second color information.

The first region may be a region in which an image of a white object is input via colored glasses, and the second region is a region in which the image of the white object is input not via the colored glasses.

Colors of the stored image may be changed to colors of a display image based on color difference information between first color information and second color information.

The method may include generating a color conversion table based on color difference information between first color information and second color information; and generating a display image by changing colors of the stored image based on the color conversion table.

The display image may be generated by calculating gradation values of the stored image including white balance based on second color information and first color information.

A digital image processing apparatus is disclosed. The digital image processing apparatus may include an image input unit configured to receive input of a setup image having a first region input via a filter and a second region input not via the filter; a storage unit configured to store first color information extracted from the first region, second color information extracted from the second region, and a stored image; a control unit configured to generate a display image by changing colors of the stored image based on the first color information and adjust white balance based on the second color information; and a display unit configured to display the display image.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, the invention will be described in detail by explaining embodiments of the invention with reference to the attached drawings.

A user with colored glasses, such as sunglasses, may operate a digital image processing apparatus, such as a digital camera. The user may view an image displayed on a display unit. Colors of the image may appear different than the actual colors of the image because of the colored glasses worn by the user.

Therefore, a digital image processing apparatus according to the invention may convert a stored image into a display image in consideration of colors of the colored glasses and display the display image. Therefore, a user with colored glasses may view an image in colors that may be close to what the colors would look like without the colored glasses.

Therefore, when a stored image is to be displayed on a display unit, such as a liquid crystal display (LCD) unit, the stored image may be converted into a display image to offset the color of the colored glasses and display the converted image on the display unit.

For example, a setup image, including at least a region of an optical signal input via a filter, e.g., colored glasses from a white object is, may be input, color information or color difference information regarding colors changed by the filter may be extracted from the setup image, a stored image may be converted into a display image by reflecting the color information or the color difference information, and the converted image may be displayed on a display unit.

A stored image may include an image that is live view image that is generated in real time and displayed to the user. The term stored image is applicable because the image is generated by converting light to electrical signals which are converted to a digital representation which must be stored prior to being displayed to the user.

Figure 1:
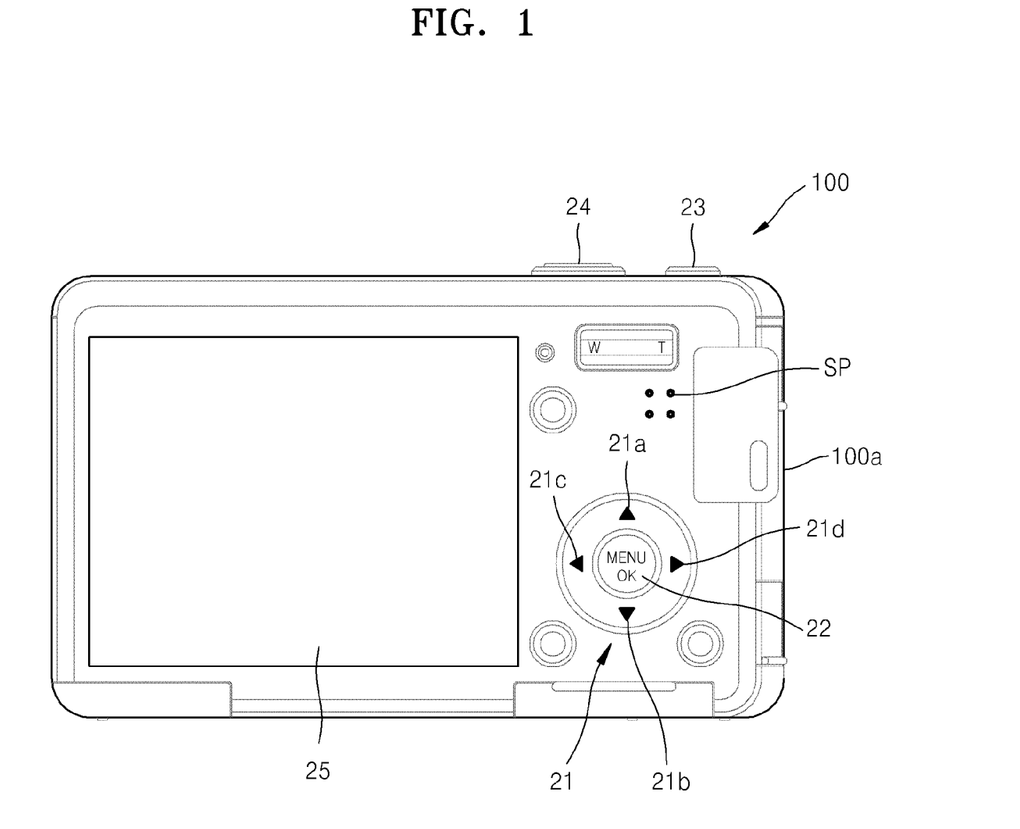
FIG. 1 is a rear view of a digital camera, which is a digital image processing apparatus according to an embodiment of the invention.

FIG. 1 is a rear view of a digital camera 100, which is a digital image processing apparatus according to an embodiment of the invention.

Referring to FIG. 1, directional buttons 21, a menu-OK button 22, a wide angle-zoom button W, a telephoto-zoom button T, a speaker SP, and a display panel 25 may be arranged on the rear surface of the digital camera 100.

The directional buttons 21 may include a total of four buttons, which are an up button 21*a*, a down button 21*b*, a left button 21*c*, and a right button 21*d*. Various functions and/or menus related to operations of a digital image processing apparatus, such as a digital camera, may be executed by operating the directional buttons 21 and the menu-OK button 22.

The wide angle-zoom button W or the telephoto-zoom button T is operated to widen or narrow a viewing angle. Especially, the wide angle-zoom button W or the telephoto-zoom button T may be used to change a size of a selected exposure region. Here, a size of a selected exposure region may be increased if the wide angle-zoom button W is operated, and a size of a selected exposure region may be decreased if the telephoto-zoom button T is operated.

The display panel 25 may include an image display device, such as a LCD. The display panel 25 may be included in a display unit (350 of FIG. 3), on which input images are displayed as live-view images or stored images are reproduced and displayed. The speaker SP may output sound.

On the other hand, a power switch 23, a shutter release button 24, a flash (not shown), and a lens unit (not shown) may be arranged on the front surface or the top surface of the digital camera 100. The directional buttons 21, the menu-OK button 22, the power switch 23, and the shutter release button 24 may be included in a user manipulation unit (360 of FIG. 3) via which a user externally inputs operation instructions.

The power switch 23 may be used to turn on or off the digital camera 100. The shutter release button 24 may be used to record an image of an object acquired by an imaging device. The imaging device may convert an optical signal of an object incident to an aperture (not shown) to an electrical signal. A control unit 200, as shown in FIG. 2, may be arranged inside and/or outside a main body 100*a* of the digital camera 100.

An example of digital image processing apparatuses to which the invention may be applied is U.S. Pat. No. 7,268,817, granted Sep. 11, 2007, entitled "METHOD OF AUTOMATICALLY FOCUSING USING A QUADRATIC FUNCTION IN CAMERA", the entire contents of which are herein included by reference.

Figure 2:
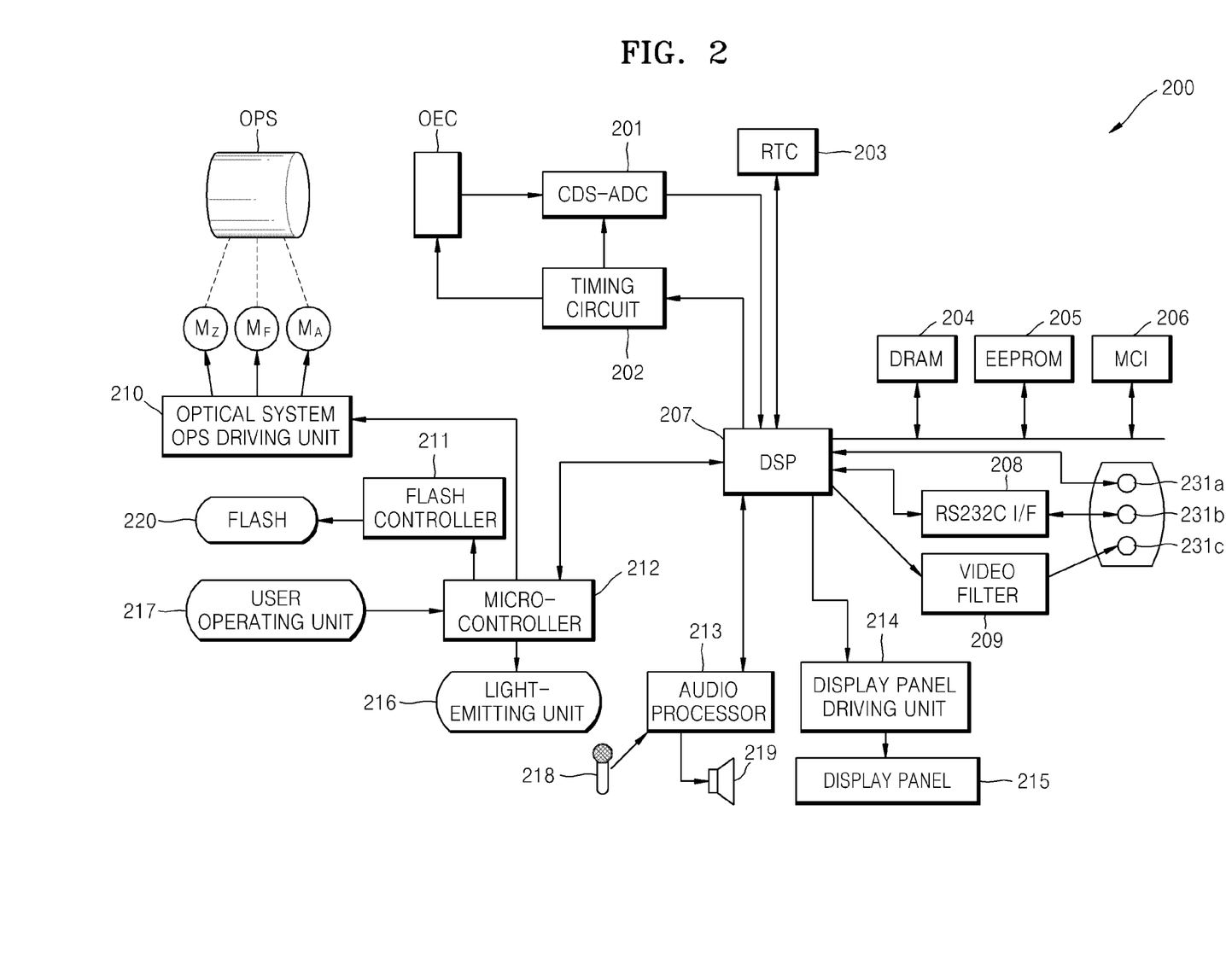
FIG. 2 is a block diagram of the control unit of the digital image processing apparatus of FIG. 1.

FIG. 2 is a block diagram of the control unit 200 of a digital image processing apparatus, according to an embodiment of the invention. In the current embodiment, the control unit 200 is installed inside the digital camera 100 of FIG. 1.

Referring to FIG. 2, an optical system OPS optically processes light from an object, and may include a lens unit and a filter unit. The lens unit of the optical system OPS includes a zoom lens, a focus lens, and a compensation lens. When a user presses the wide angle-zoom button W or the telephoto-zoom button T, which may be included in a user operating unit 217, a corresponding signal is input to a micro-controller 212.

Therefore, as the micro-controller 212 controls the user operating unit 217, a zoom motor $M_Z$ is driven, and thus the zoom lens moves. In other words, the focal length of the zoom lens decreases and the viewing angle is widened when the wide angle-zoom button W is pressed, whereas the focal length of the zoom lens increases and the viewing angle is narrowed when the telephoto-zoom button T is pressed.

On the other hand, in an auto-focus mode, a main controller integrated in a digital signal processor (DSP) 207 controls an optical system OPS driving unit 210 via the micro-controller 212, and thus a focus motor $M_F$ is driven. In other words, auto-focusing may be performed by driving the focus motor $M_F$ and moving the focus lens to a position at which the clearest image may be acquired.

The compensation lens compensates for a total refractive index and is not driven. An aperture adjusting motor $M_A$ drives an aperture (not shown).

The filter unit of the optical system OPS may include an optical low pass filter and an infrared cut-off filter. The optical low pass filter removes high frequency optical noise. The infrared cut-off filter blocks the infrared component of incident light.

An optoelectronic converter OEC may include an imaging device, such as a charge-coupled device (CCD) or a complementary metal-oxide semiconductor (CMOS). The optoelectronic converter OEC converts light from the optical system OPS to an analog signal.

An analog-to-digital converter (ADC) may include a correlation double sampler and analog-to-digital converter (CDS-ADC) device 201. The CDS-ADC 201 processes an analog signal from the optoelectronic converter OEC, removes high frequency noise thereof and adjusts amplitudes thereof, and converts the analog signal to a digital signal. Here, the DSP 207 controls a timing circuit 202 to control operations of the optoelectronic converter OEC and the CDS-ADC 201.

According to embodiments of the invention, the optical system OPS, the optoelectronic converter OEC, and the CDS-ADC 201 may be integrated in an image input unit (310 of FIG. 3), which receives inputs of an input image and/or a setup image.

A real-time clock 203 provides time information to the DSP 207. The DSP 207 processes a digital signal from the CDS-ADC 201 and generates digital image signals categorized as brightness (Y values) signals and hue signals (R, G, and B) or contrast signals, brightness signals, and hue signals (R, G, and B).

A light-emitting unit 216, which is driven by the micro-controller 212 as the main controller integrated in the DSP 207 controls the micro-controller 212, and may include a self-timer lamp, an auto-focus lamp, a mode indicator lamp, and a flash standby lamp.

The user operating unit 217 may include the directional buttons 21, the menu-OK button 22, the power switch 23, and the shutter release button 24, as shown in FIG. 1. The user operating unit 217 may be included in a user operating unit (360 of FIG. 3).

A dynamic random access memory (DRAM) 204 temporarily stores digital image signals form the DSP 207. An electrically erasable programmable read-only memory (EEPROM) 205 stores methods required for operating the DSP 207, such as a booting program and a key input program, and setup data. Here, the setup data may include first color information, second color information, and/or color difference information. A memory card of a user may be detachably attached to a memory card interface 206.

The DSP 207 and/or the micro-controller 212 may be included in a control unit (320 of FIG. 3) according to the invention. Furthermore, cache memories may be installed to the DSP 207 and/or the micro-controller 212 as temporary storage spaces.

Figure 3:
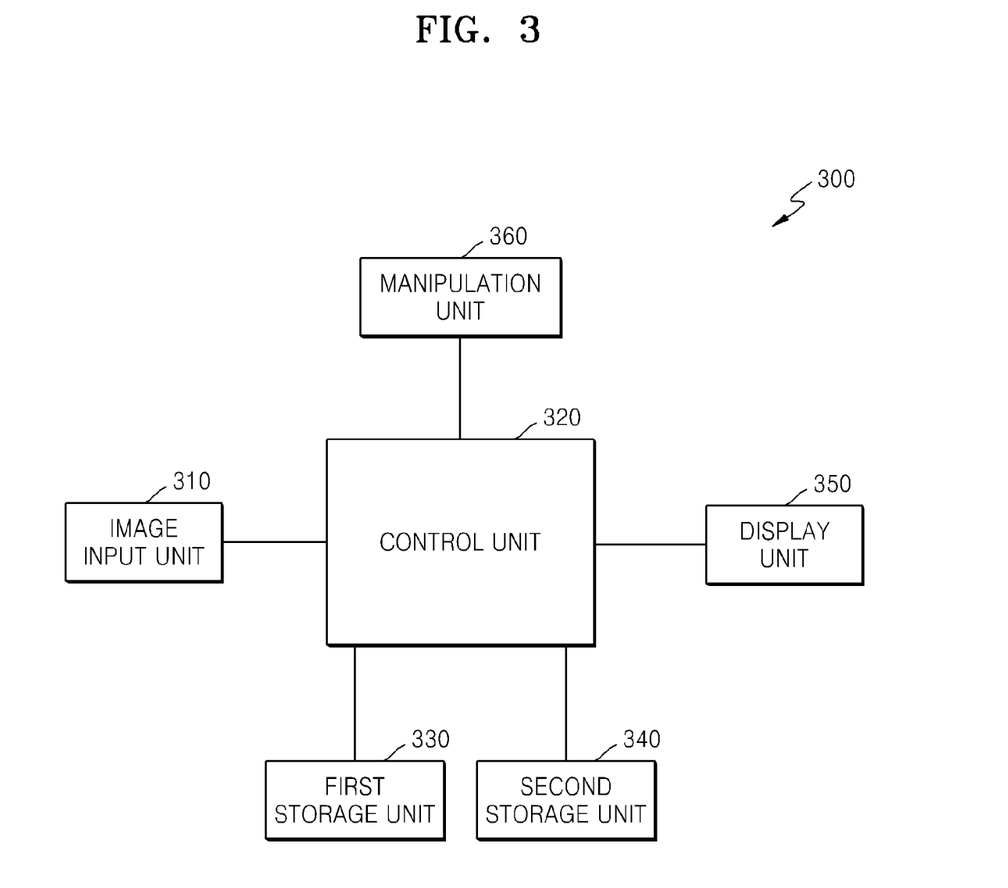
FIG. 3 is a block diagram of a digital image processing apparatus according to an embodiment of the invention.

Here, a cache memory and the DRAM 204 for temporarily storing data including input images may be included in a first storage unit (330 of FIG. 3). A cache memory included in the first storage unit (330 of FIG. 3) may be included separate from the DSP 207 and/or the micro-controller 212.

A memory card recognized by the memory card interface 206 is a non-volatile memory to which a captured image or an image transmitted from an externally connected device is stored, and may be included in a second storage unit 230 of FIG. 3. The EEPROM 205 may be included in the first storage unit 330 and/or the second storage unit 340.

Digital image signals from the DSP 207 are input to a display panel driving unit 214, and thus an image is displayed on a display panel 215.

The control unit 200 may further include the display panel driving unit 214 and the display unit 215. The display panel driving unit 214, drives the display panel 215. The display panel driving unit 214 and the display unit 215 may be included in the display unit (350 of FIG. 3), on which input images are displayed as live-view images or stored images are reproduced and displayed.

On the other hand, digital image signals from the DSP 207 may be transmitted in a serial communication via a universal serial bus (USB) connection unit 231a or a RS232C interface 208 and a connection unit 231b thereof, and may be transmitted as video signals via a video filter 209 and a video output unit 231c. Here, the DSP 207 may include a micro-controller.

An audio processor 213 outputs voice signals from a microphone 218 to the DSP 207 or a speaker 219 and outputs audio signals from the DSP 207 to the speaker 219. A flash controller 211 controls operations of a flash 220. The flash controller 211 may be controlled according to a control signal output by the micro-controller 212.

FIG. 3 is a block diagram of a digital image processing apparatus 300 according to an embodiment of the invention. The digital image processing apparatus 300 may be controlled by using methods S400 and S500 of controlling a digital image processing apparatus respectively shown in FIGS. 4 and 5.

Referring to FIG. 3, the digital image processing apparatus 300 may include the image input unit 310, the control unit 320, the first and second storage units 330 and 340, the display unit 350, and the manipulation unit 360.

The image input unit 310 receives input of a setup image including a first region input via a filter. The first and second storage units 330 and 340 store first color information extracted from a first region and a stored image. The control unit 320 generates a display image by converting colors of the stored image based on the first color information. The display unit 350 displays the display image. The manipulation unit 360 receives user inputs.

The digital image processing apparatus 300 may convert a stored image into a display image by compensating for a user wearing colored glasses, so that the user may view an image as it would be seen without the colored glasses. The display image may then be displayed on the display unit 350.

The user wearing colored glasses may avoid the inconvenience of having to take the colored glasses off to view an image displayed on the display unit 350, therefore, the convenience of the user may be improved.

Here, the manipulation unit 360 may include a select button, a mode dial, a menu interface, or other operating controls. First color information or color difference information may be extracted from the setup image that is input in a sunglasses setup mode, which may be toggled on or off by operating the manipulation unit 360. Furthermore, when a sunglasses display mode is selected by an operation of the manipulation unit 360, a display image may be displayed on the display unit 350 that reflects first color information or color difference information thereto.

On the other hand, a filter used to input a first region may be colored glasses, such as sunglasses. In this case, the first region may be a region in which an image of a white object is input via colored glasses. The first region may be a first region 61 included in a setup image 60 shown in FIG. 6.

However, the invention is not limited thereto, and the first region may be a region in which an image of a non-white object is input via colored glasses. In this case, first color information or color difference information may be acquired in consideration of a color of an object included in the first region.

Figure 7:
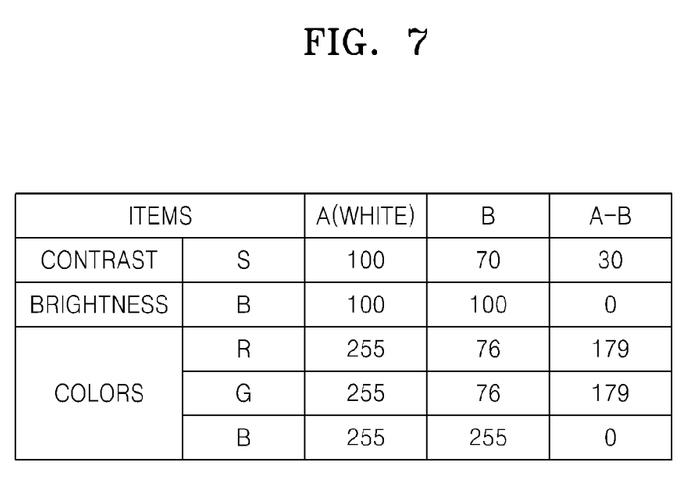
FIG. 7 shows a table including an example of first color information and color difference information extracted from a setup image as shown in FIG. 6.
Figure 8:
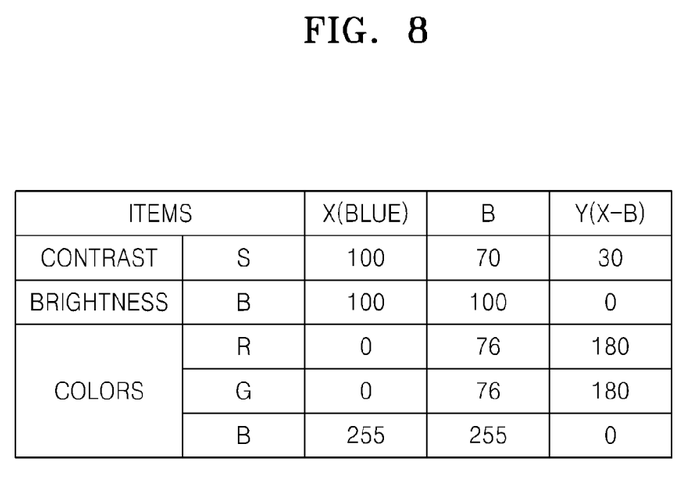
FIG. 8 shows an embodiment of calculating a gradation value of a display image based on a value of gradation to be displayed of a stored image and a gradation value of first color information.

In this case, the color difference information may be a gradation difference corresponding to a difference between first color information, that is, a difference between white, which is the original color of an object in the first region, and a color of colored glasses. Here, first color information B and color difference information A−B may include contrast, brightness, and color gradation as shown in the tables of FIGS. 7 and 8.

In this case, the first region enables easy recognition of colors changed by colored glasses based on the change of white color. Therefore, changes of colors of any other gradations due to colored glasses may be recognized relatively accurately. Therefore, the control unit 320 may generate display images with respect to colors of any gradations relatively accurately by converting colors of stored images based on first color information.

Also, a display image may be acquired via calculations of gradation values of colors of a stored image and first color information. FIG. 8 shows an embodiment of calculating a gradation value Y of a display image based on a value X of gradation to be displayed of a stored image and a gradation value of first color information B. Here, the gradation value Y of a display image may be calculated by subtracting a gradation value of first color information B from a value X of gradation to be displayed of a stored image, that is, Y=X−B.

Alternatively, colors of a stored image may be changed to colors of a display image based on color difference information regarding first color information and information of a background color of the first color information. An example of color difference information A−B is shown in the table of FIG. 7. The color difference information A−B may be calculated by subtracting first color information B from white color A, that is, A−B.

In this case, a color conversion table may be generated with respect to each of the gradation values based on color difference information, and colors of a stored image may be changed to colors of a display image based on the color conversion table. Here, the color conversion table may be embodied by using known techniques used in general digital cameras for various functions.

Here, a color conversion table may be a lookup table or a color space in which colors of a stored image correspond to colors of a display image with respect to all colors and all gradations. In this case, the color conversion table may be useful even if gradations corresponding to each of the colors of a stored image do not linearly correspond to gradations corresponding to each of the colors of a display image due to a color difference.

Also, a setup image may include a first region, which is input via a filter, and a second region, which is input not via the filter. In this case, first color information extracted from the first region and second color information extracted from the second region may be stored in the first and second storage units 330 and 340 respectively. Storage units 330 and 340 may be the same storage unit.

The first region may be a region in which an image of a white object is input via colored glasses, whereas the second region may be a region in which the image of the white object is input not via the colored glasses.

In this case, the control unit 320 may set white balance based on the second color information and generate a display image by converting colors of a stored image based on the first color information. The display image may be displayed on the display unit 350.

Colors of a stored image may be changed to colors of a display image based on color difference information regarding first color information and second color information and may be displayed on the display unit 350. In this case, a color conversion table generated with respect to each of the gradation values based on color difference information may be stored in the first and second storage units 330 and 340, and colors of a stored image may be changed to colors of a display image with reference to the color conversion table.

Alternatively, a display image may be acquired by calculating gradation values of a stored image, of which white balance is adjusted based on second color information and first color information.

Figure 6:
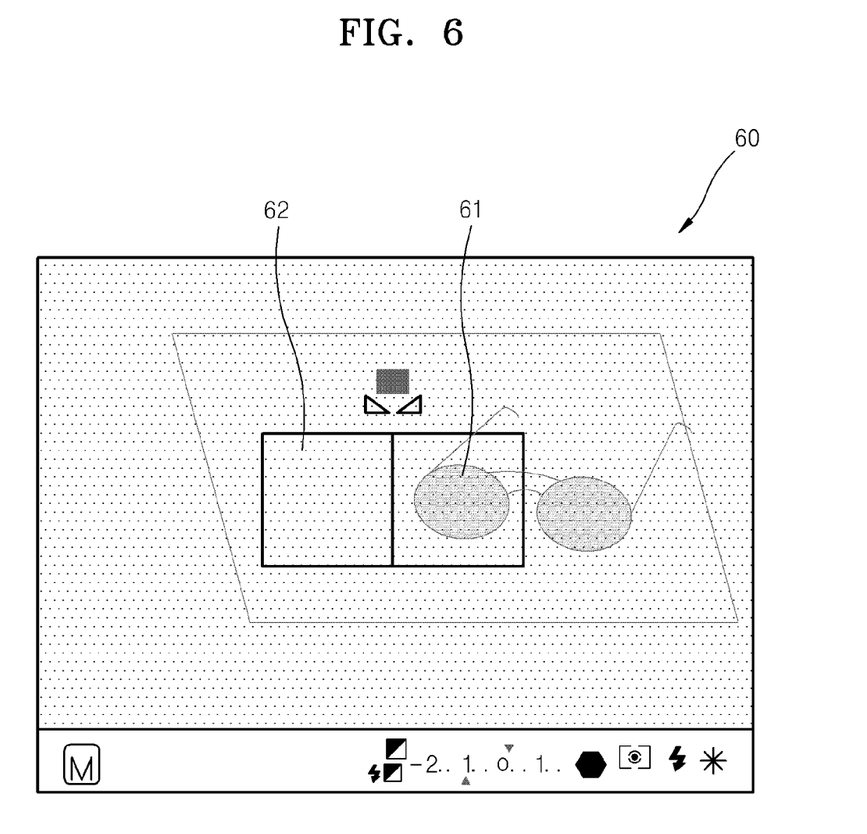
FIG. 6 shows a setup image displayed on a display unit when the setup image is input in auto white balance (AWB) sunglasses setup mode.

FIG. 6 shows a setup image 60 displayed on the display unit 350 when the setup image is input in auto white balance (AWB) sunglasses setup mode. Here, the setup image 60 may include a first region 61 and a second region 62. However, the invention is not limited thereto, and the setup image 60 may include the first region 61 only.

The second region 62 may be used for a user to directly set white balance by using a custom setup function for AWB according to various illumination conditions. Therefore, as shown in FIG. 6, the setup image 60 may be input while two rectangular zones are located at a white object in AWB sunglasses setup mode.

In this case, the first region 61 is a region input by locating sunglasses in one of the rectangular zones. The second region 62 may be a region input from the other rectangular zone, in which sunglasses are not located. In this case, an image input in user AWB setup mode may be stored after white balance of the image is adjusted based on second color information extracted from the second region 62.

On the other hand, a stored image to be displayed on the display unit 350 may be an input image temporarily stored for live-view display. Alternatively, the stored image may be an image input via the image input unit 310 or an image input by an external device.

Referring to FIGS. 7 and 8, the AWB sunglasses setup mode and the sunglasses display mode will be described. For example, in FIG. 6, the first region 61 may be a region input via blue sunglasses. In this case, when an image is captured in the AWB sunglasses setup mode, color information A of the second region 62 may include red (R), green (G), and blue (B) components of the second region 62 having a value 255 (in case of 8-bits) at 100% contrast and brightness.

The first region 61 may be displayed in a light blue color, due to the blue sunglasses and a white paper therebelow. In this case, if it is assumed that contrast is reduced by 30%, values of red (R), green (G), and blue (B) components may be 76, 76, and 255, respectively, at 100% brightness. In this case, differences of each of the components of the second region 62 and the first region 61 may be calculated and stored as color difference information A−B.

Figure 4:
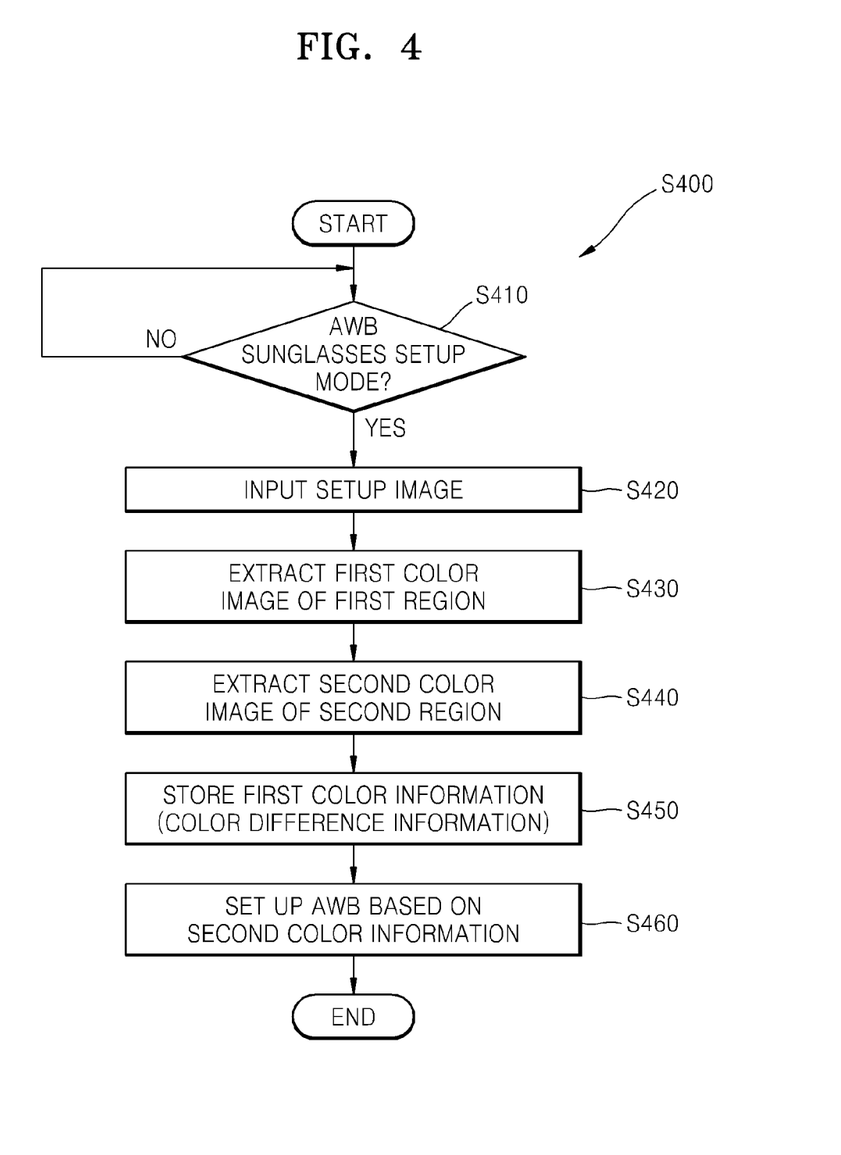
FIGS. 4 and 5 are flowcharts showing methods of controlling a digital image processing apparatus according to embodiments of the invention.
Figure 5:
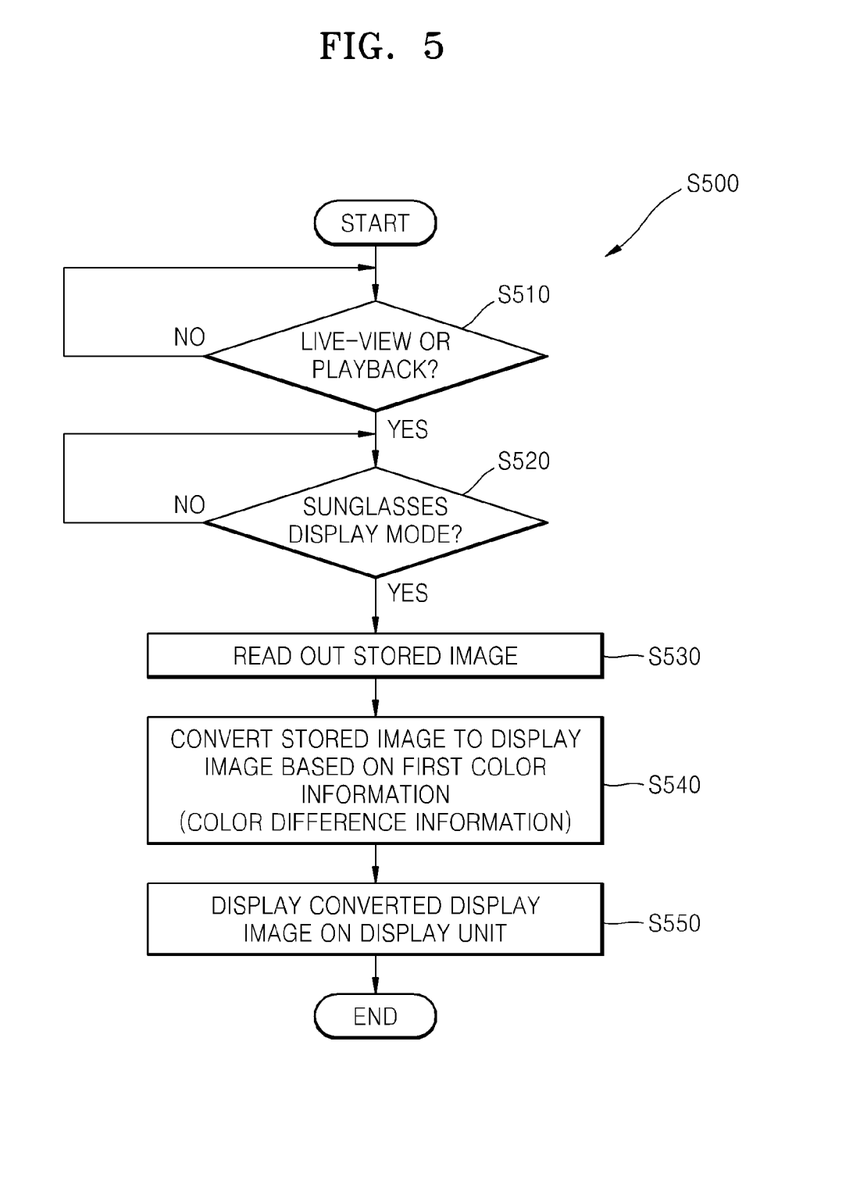

Here, the AWB sunglasses setup mode S400 and live-view or playback in the sunglasses display mode S500 may be embodied as shown in flowcharts of FIGS. 4 and 5, respectively.

The image input unit 310 receives an input image from outside. The image input unit 310 may include the optical system OPS, the optoelectronic converter OEC, and the CDS-ADC 201, as shown in FIG. 2.

The control unit 320 may control the image input unit 310, the first and second storage units 330 and 340, the display unit 350, and the user operating unit 360. The control unit 320 may include the DSP 207 and/or the micro-controller 212.

An input image, a setup image, an image for storage, a display image, first color information, second color information, and/or color difference information may be stored in the first and second storage units 330 and 340. The first and second storage units 330 and 340 may include one or more storage units. The first storage unit 330 may include the micro-controller 212.

An input image, a setup image, a display image, first color information, second color information, and/or color difference information may be stored in the first and second storage units 330 and 340. An image for storage may be stored in the first or second storage unit 330 and 340.

The display unit 350 may include the display panel 25 as shown in FIG. 1 and/or the display panel driving unit 214 and the display panel 215 as shown in FIG. 2. The user operating unit 360 may include the directional buttons 21, the menu-OK buttons 22, and/or the user operating unit 217 as shown in FIG. 2.

According to the invention, a user may view an image displayed on a display unit with colors close to the actual colors of the image even when the user is wearing sunglasses.

FIGS. 4 and 5 are flowcharts showing methods S400 and S500 of controlling a digital image processing apparatus according to embodiments of the invention, respectively.

The methods S400 and S500 of controlling a digital image processing apparatus may be performed by the digital image processing apparatus 300. Here, the methods S400 and S500 of controlling a digital image processing apparatus may be stored in a storage unit as shown in FIG. 2 or may be embodied as programs or methods embodied in semiconductor chips, such as firmware.

Referring to FIGS. 4 and 5, the methods S400 and S500 of controlling a digital image processing apparatus may include the sunglasses setup mode S400 and the sunglasses display mode S500. The sunglasses setup mode S400 may include inputting a setup image (step S420), extracting color information (operations S430 and S440), and storing the color information (operation S450).

In operation S420, a setup image, which includes a first region input via a filter, is input. In operations S430 and S440, first color information is extracted from the first region. In operation S450, the first color information and/or color difference information are stored. Here, the first region may be a region in which an image of a white object is input via colored glasses.

The sunglasses setup mode S400 may be toggled by operating a separate selection button, a mode dial, a menu interface, or the like. Here, if it is determined in operation S410 that AWB sunglasses setup mode is active, first color information or color difference information may be extracted from a setup image input in the sunglasses setup mode S400.

The sunglasses display mode S500 may include reading a stored image (step S530), generating a display image (operation S540), and displaying the display image (operation S550).

In operation S530, a stored image is read out. In operation S540, a display image is generated by changing colors of the stored image based on first color information. In operation S550, the display image is displayed.

The sunglasses display mode S500 may be toggled by operating a separate selection button, a mode dial, a menu interface, or the like. Here, if it is determined in operations of determining a second mode S510 and S520 that live-view display or playback is performed in the sunglasses display mode, the display image may be displayed on a display unit based on the first color information or color difference information.

Also, a stored image to be displayed on the display unit 350 may be an input image temporarily stored for live-view display. Alternatively, the stored image may be an image input via the image input unit 310 or an image input by an external device.

According to the methods S400 and S500 of controlling a digital image processing apparatus, a stored image may be converted into a display image in consideration of a color of the colored glasses and may be displayed on a display unit. Therefore, the user may view an image in colors that may be seen without the colored glasses.

Therefore, a user wearing colored glasses may avoid the inconvenience of taking the colored glasses off to view an image displayed on the display unit 350, and user convenience may be improved.

Here, a first region may be a region in which an image of a white object is input via colored glasses. In this case, in operation S540, a display image may be acquired by calculating gradation values of colors of a stored image and first color information.

Alternatively, a setup image may include a first region, which is input via a filter, and a second region, which is input not via the filter. In this case, first color information may be extracted from the first region and second color information may be extracted from the second region in operations S430 and S440 respectively. In this case, white balance may be set based on the second color information at an operation of setting up AWB (operation S460).

The first region may be a region in which an image of a white object is input via colored glasses, whereas the second region may be a region in which the image of the white object is input not via the colored glasses.

In operation S540, a display image may be generated by changing colors of the stored image based on first color information. The display image may be displayed on the display unit 350 of FIG. 3.

Colors of a stored image may be changed to colors of a display image based on color difference information between first color information and second color information and may be displayed on a display, e.g., the display unit 350 of FIG. 3. In this case, a color conversion table may be generated with respect to each of the gradation values based on color difference information, and colors of a stored image may be changed to colors of a display image based on the color conversion table.

Alternatively, a display image may be acquired by calculating gradation values of a stored image, of which white balance is adjusted based on second color information and first color information.

FIG. 6 shows a setup image 60 displayed on the display unit 350 when the setup image is input in an auto white balance (AWB) sunglasses setup mode. Here, the setup image 60 may include a first region 61 and a second region 62. The second region 62 may be used for a user to directly set white balance by using a custom setup function for AWB according to various illumination conditions However, the invention is not limited thereto, and the setup image 60 may include the first region 61 only.

In FIGS. 7 and 8, color information of a stored image, color information of a display image, first color information B, and color difference information A−B may include contrast, brightness, and color gradations of red, green, and blue.

FIG. 7 shows a table including an example of first color information B and color difference information A−B extracted from a setup image as shown in FIG. 6. Referring to FIG. 7, colors of a stored image may be changed to colors of a display image based on color difference information regarding first color information and information of a background color of the first color information. The color difference information A−B may be calculated by subtracting first color information B from white color A, that is, A−B.

In this case, a color conversion table may be generated with respect to each of the gradation values based on color difference information, and colors of a stored image may be changed to colors of a display image based on the color conversion table. Here, the color conversion table may be embodied by using the same technique used in general digital cameras for various functions, such as PictureWizard™.

On the other hand, FIG. 8 shows a table showing that a gradation value Y of a display image is calculated based on a value X of gradation to be displayed of a stored image and a gradation value of first color information B extracted in operation S410. Here, the gradation value Y of a display image may be calculated by subtracting a gradation value of first color information B from a value X of gradation to be displayed of a stored image, that is, Y=X−B.

According to embodiments of the invention, a user may view an image displayed on a display unit with colors close to the actual colors of the image even when the user is wearing sunglasses.

While the invention has been particularly shown and described with reference to exemplary embodiments thereof, it will be understood by those of ordinary skill in the art that various changes in form and details may be made therein without departing from the spirit and scope of the invention as defined by the following claims.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar references in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, operations of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A digital image processing apparatus comprising:
   an image input unit having an imaging device and an optoelectronic converter configured to receive image light and to convert the received image light to an electrical signal from a setup image having:
      a first region in which an image of a white object is input via colored glasses, and a second region in which an image of the white object is input not via the colored glasses;

a storage unit configured to store a first color information and a stored image;

a control unit configured to determine first color information from the first region based on the electrical signal, and configured to convert the stored image to a display image based on the first color information, wherein the converting compensates for the effects of the colored glasses so that the display image, when viewed through the colored glasses, appears as the stored image appears when viewed without the colored glasses; and a display unit configured to display the display image.

2. The digital image processing apparatus of claim 1, wherein the control unit is configured to convert the display image by adjusting gradation values of colors of the stored image using the first color information.

3. The digital image processing apparatus of claim 1, wherein the control unit is further configured to determine second color information from the second region, and the control unit is further configured to convert a display image by adjusting a white balance of the stored image based on the second color information.

4. The digital image processing apparatus of claim 1, wherein the controller unit is further configured to convert the stored image to a display image by changing colors of the stored image based on color difference information between first color information and second color information.

5. The digital image processing apparatus of claim 4, wherein the controller is further configured to determine a color conversion table that includes gradation values based on color difference information, and the control unit is further configured to convert the stored image to a display image by changing colors of the stored image based on the color conversion table.

6. The digital image processing apparatus of claim 1, wherein the control unit is further configured to convert the stored image to a display image by changing gradation values of the stored image based on the first color information, and adjust white balance based on second color information.

7. A method of controlling a digital image processing apparatus, the method comprising:

receiving image light from a setup image having:
a first region in which an image of a white object is input via colored glasses, and
a second region in which an image of the white object is input not via the colored glasses;

converting the received image light to an electrical signal;

extracting first color information from the first region based on the electrical signal;

retrieving a stored image;

generating a display image by changing colors of the stored image based on the first color information to compensate for the effects of the colored glasses so that the display image, when viewed through the colored glasses, appears as the stored image appears when viewed without the colored glasses; and displaying the display image.

8. The method of claim 7, wherein the display image is generated by calculating gradation values of colors for the display image based on gradation values of colors of the stored image and gradation values of colors of the first color information.

9. The method of claim 7, further comprising:
extracting second color information from the second region, and
adjusting a white balance of the stored image input based on the second color information.

10. The method of claim 7, wherein colors of the stored image are changed to colors of a display image based on color difference information between first color information and second color information.

11. The method of claim 9, further comprising:
generating a color conversion table based on color difference information between first color information and second color information; and
generating a display image by changing colors of the stored image based on the color conversion table.

12. The method of claim 7, wherein the display image is generated by calculating gradation values of the stored image including white balance based on second color information and first color information.

13. The method of claim 7, further comprising:
prompting a user to place the colored glasses in front of a white background.

14. A digital image processing apparatus comprising:

an image input unit having an imaging device and an optoelectronic converter configured to receive image light and to convert the received image light to an electrical signal from a setup image having:
a first region in which an image of a white object is, input via colored glasses; and
a second region in which includes an image of the white object, input not via the colored glasses;

a storage unit configured to store first color information extracted from the first region based on the electrical signal, second color information extracted from the second region based on the electrical signal, and a stored image;

a control unit configured to generate a display image by changing colors of the stored image based on the first color information and adjust white balance based on the second color information, wherein generating the display image comprises changing the colors and adjusting the white balance of the stored image to compensate for the effects of the colored glasses so that the display image, when viewed through the colored glasses, appears as the stored image appears when viewed without the colored glasses; and a display unit configured to display the display image.

* * * * *